(12) United States Patent
Lee et al.

(10) Patent No.: US 6,535,472 B1
(45) Date of Patent: Mar. 18, 2003

(54) HOLOGRAM RECORDING APPARATUS AND METHOD THEREFOR

(75) Inventors: Myeongkyu Lee, Tsukuba (JP); Kenji Kitamura, Tsukuba (JP); Yasunori Furukawa, Tsukuba (JP); Shunji Takekawa, Tsukuba (JP); Hideki Hatano, Tsurugashima (JP)

(73) Assignees: Director General of National Institute for Research in Inorganic Materials, Science and Technology Agent, Japan, Ibaraki (JP); Pioneer Corporation, Tokyo (JP)

( * ) Notice: Subject to any disclaimer, the term of this patent is extended or adjusted under 35 U.S.C. 154(b) by 198 days.

(21) Appl. No.: 09/631,646

(22) Filed: Aug. 2, 2000

(30) Foreign Application Priority Data

Aug. 31, 1999 (JP) .......................................... 11-244296

(51) Int. Cl.[7] ................................................ G11B 7/00
(52) U.S. Cl. ...................................................... 369/103
(58) Field of Search ............................ 369/103, 112.21, 369/108; 359/3, 7

(56) References Cited

U.S. PATENT DOCUMENTS 5,978,108 A * 11/1999 Bai et al. ..................... 369/103

* cited by examiner

Primary Examiner—Nabil Hindi (57) ABSTRACT

A hologram recording apparatus is capable of directing interferable signal light and reference light into a hologram recording medium to record an information signal carried by the signal light. The hologram recording medium is sensitive to a first light at a first wavelength in an ultraviolet or short-wavelength visible light band to develop light induced absorption. The apparatus includes a light source for irradiating the hologram recording medium with the first light, and a laser light source for irradiating the hologram recording medium with signal light and reference light at a second wavelength longer than the first wavelength after the first light is irradiated.

7 Claims, 5 Drawing Sheets

HOLOGRAM RECORDING APPARATUS AND METHOD THEREFOR

BACKGROUND OF THE INVENTION

1. Field of the Invention

The present invention relates generally to a holographic memory and to an optical information recording/reproducing apparatus utilizing the holographic memory, and more particularly to a hologram recording apparatus and a method therefor for recording a signal which are free from deterioration when it is reproduced later.

2. Description of the Related Art

Conventionally, a holographic memory system is known as a digital recording system which applies the principle of holography. In the following, a holographic memory system will be generally described with reference to FIG. 1.

Figure 1:
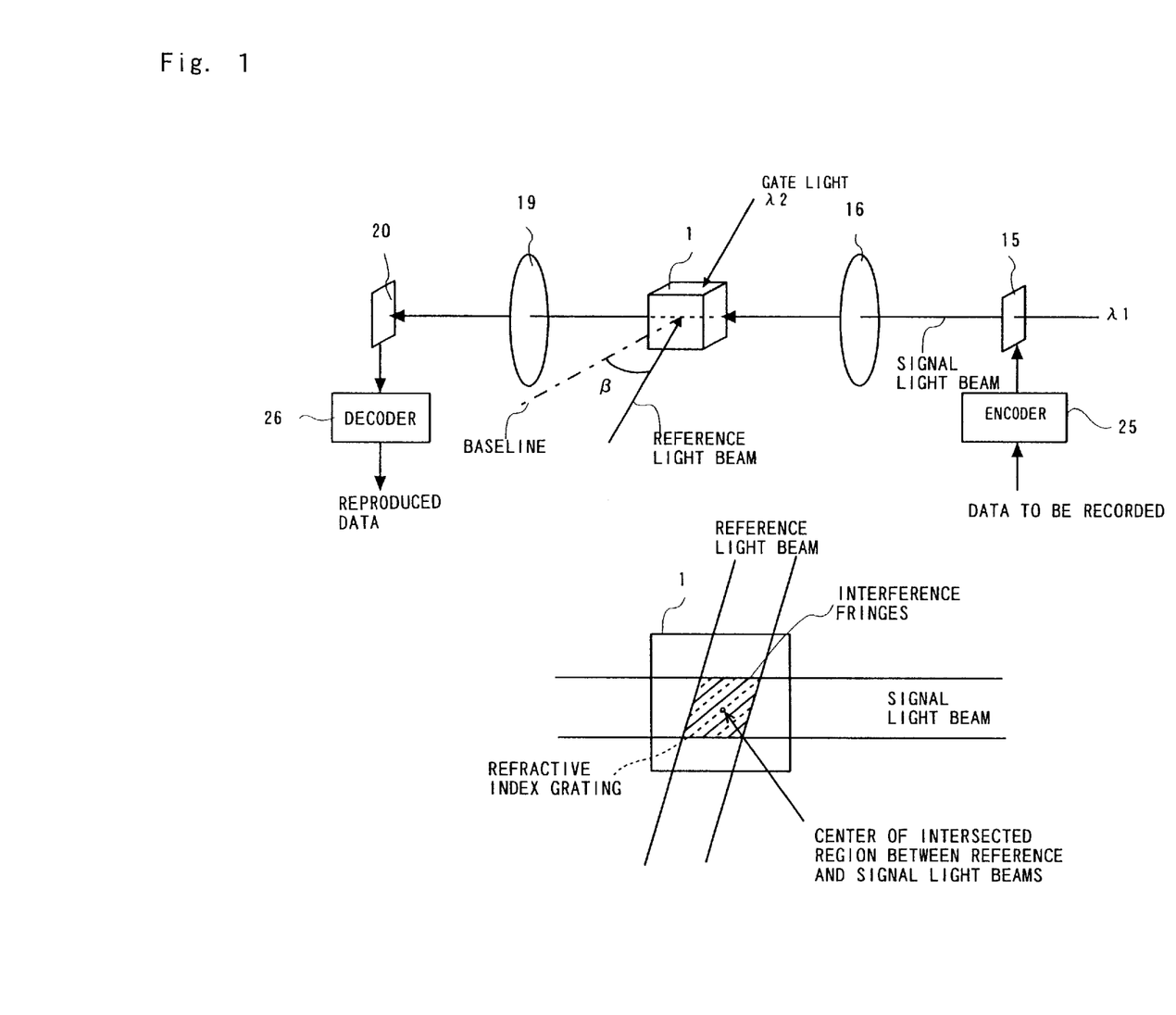
FIG. 1 is a schematic diagram illustrating a conventional hologram recording system.

In FIG. 1, an encoder 25 converts digital data to be recorded in a holographic memory 1 to a light/dark dot pattern image on a plane, and rearranges the dot pattern image into a data array of, for example, 480 bits in the vertical direction and 640 bits in the horizontal direction (480×640) to generate sequence data in unit pages. This data is sent to a spatial light modulator (SLM) 15, such as a transmission-type TFT liquid crystal display (LCD) panel, by way of example.

The spatial light modulator 15, which has a modulation processing unit corresponding to the unit page composed of 480 bits in the vertical direction and 640 bits in the horizontal direction (480×640), optically modulates a light beam irradiated thereto to spatial light on/off signal in accordance with the unit page sequence data from the encoder 25, and sends the modulated signal beam or signal light to a lens 16. More specifically, the spatial light modulator 15 passes therethrough a signal beam corresponding to a logical value "1" in the unit page sequence data which is an electrical signal, and blocks the signal beam corresponding to a logical value "0" in the unit page sequence data to achieve photo-electric conversion in accordance with respective bit contents of the unit page data, thereby generating a signal beam which is modulated as signal light of the unit page sequence.

The signal light is incident on the holographic memory 1 through a lens 16. In addition to the signal light, the holographic memory 1 is also irradiated with reference light at an incident angle β from a predetermined base line orthogonal to the optical axis of the beam of the signal light.

The signal light and the reference light interfere with each other in the holographic memory 1 to produce interference fringes which are stored in the holographic memory 1 as a refractive index grating or hologram to record the data. Also, the holographic memory 1 provides for three-dimensional data recording by entering the reference light thereto with a different incident angle β to record a plurality of two-dimensional planar data in an angle multiplex scheme.

For reproducing recorded data from the holographic memory 1, the reference light only is directed into the holographic memory 1 at the same incident angle β as recording, toward the center of a region in which the signal light beam and the reference light beam intersect. In other words, unlike recording, the signal light is not directed. In this way, diffraction light from the interference fringes recorded in the holographic memory 1 is transmitted to a CCD (Charge Coupled Device) 20, which functions as a photodetector, through a lens 19. The CCD 20 converts light and dark of the incident light to the intensity of an electrical signal to produce an analog electrical signal having a level in accordance with the luminance of the incident light, which is output to a decoder 26. The decoder 26 compares this analog signal with a predetermined amplitude value (slice level) to reproduce corresponding data "1" and "0".

Since the holographic memory records data in two-dimensional planar data sequences as described above, the angle multiplex recording can be accomplished by changing the incident angle β of the reference light. Stated another way, a plurality of two-dimensional planes as recording units can be defined in the holographic memory by changing the incident angle β of the reference light, with the result that three-dimensional recording is enabled.

Conventionally, for a rewritable holographic memory 1 utilizing the photo-refractive effect, Fe-added lithium niobate ($LiNbO_3$, or abbreviated as "LN") single crystals are used as recording materials, while a wavelength of 532 nm, which is a second harmonic of an Nd:YAG laser, is used as recording light. In this conventional recording scheme (called the "conventional single-color recording scheme"), corresponding to interference fringes formed from signal light and reference light, which are recording light, electrons are excited from an $Fe^{2+}$ state to a conduction band in light regions of the interference fringes, undergo a photo-refractive process, and are finally trapped to an $Fe^{3+}$ state to complete the storage.

However, the conventional single-color recording scheme implies a problem that reproduction light gradually erases the recorded hologram when a signal is read from the hologram (which is so called reproduction deterioration). The medium has a sensitivity to light of one wavelength that is used at the time of recording and reproduction. In the single color hologram, recorded information is electrons trapped at the trap level (storage center) which is produced by Fe. That is, every time reproduction is performed, electrons are gradually excited to the conduction band from the trap level, thereby erasing the stored information. According to the conventional holographic memory, when signals are read from a hologram recorded there, reproduction light gradually erases the hologram, so that the reproduction deterioration occurs.

On the other hand, a two-color hologram scheme is known as a recording scheme which suffers from less reproduction deterioration.

The two-color hologram recording is characterized in that a hologram is recorded by simultaneously irradiating other light called "gate light" (at wavelength $\lambda 2$), in addition to recording light (reference light and signal light at wavelength $\lambda 1$) for forming the hologram. The gate light acts to develop a recording sensitivity at the wavelength ($\lambda 1$) of the recording light only during the irradiation of the gate light. Such a characteristic is based on carriers temporarily formed by the irradiated gate light at a relatively shallow energy state called an "intermediate excitation state" within a portion of the crystal irradiated with the gate light. The carriers at the intermediate excitation state are excited by the recording light (a spatial light/dark pattern corresponding to interference fringes formed by the reference light and the signal light), and finally accumulated in the form of a variable density distribution of the carriers corresponding to the interference fringes at a deep trap state. The latter process of the two-color hologram scheme, which is called the "photo-refractive effect," is in principle the same process as the single-color hologram. For example, with the two-color hologram recording scheme using crystals which are processed to be reduced to $LiNbO_3$ with no additive component or with Fe added thereto, and have a composition close to the stoichiometry (abbreviated as "SLN") (H. Guenther, R. M. Macfarlane, Y. Furukawa, K. Kitamura, R. Neurgaonkar; "Two-color holography in reduced near-stoichiometric lithium niobate", Appl. Opt. Vol. 37, pp. 7611–7623 (1998)), the lifetime of carriers at the intermediate excitation state (metastable state) can be extended from microseconds to seconds, thereby making it possible to use a continuous oscillating laser having relatively small power for recording.

While the two-color hologram recording scheme requires a reduction of a recording material to increase the PR center density (bipolaron-polaron mechanism), this results in a lower density of $Fe^{3+}$ (trivalent) to degrade the transparency of the material itself. Also, since the light sensitivity is still insufficient for a practical level, there has been a need for development of a hologram recording scheme which provides a higher sensitivity.

Further, in the two-color holographic recording scheme, if the lifetime of the intermediate excitation state is so long that carriers exist at that state even after writing, carriers excited upon reading reflect the electric field to recombine. As a result, since such carriers cancel the previously formed spatial electric field, the diffraction efficiency is significantly reduced.

OBJECT AND SUMMARY OF THE INVENTION

It is therefore an object of the present invention to provide a hologram recording apparatus which is capable of increasing the light sensitivity, and for reducing the signal deterioration during reproduction to exhibit good data indestructibility.

The present invention provides a hologram recording apparatus for directing interferable signal light and reference light into a hologram recording medium to record an information signal carried by the signal light, wherein hologram recording medium is sensitive to a first light at a first wavelength in an ultraviolet or short-wavelength visible light band to develop light induced absorption. The apparatus includes means for irradiating the hologram recording medium with the first light; and means for irradiating the hologram recording medium with signal light and reference light at a second wavelength longer than the first wavelength after the first light is irradiated.

In an aspect of the present invention, said hologram recording medium comprises a photo-refractive material selected from a group consisting of a lithium niobate ($LiNbO_3$) single crystal which includes a rare earth element, and has a molar fraction of $[Li_2O]/([Li_2O]+[Nb_2O_5])$ in a range of 0.482 to 0.505, or a lithium tantalate ($LiTaO_3$) single crystal which includes a rare earth element, and has a molar fraction of $[Li_2O]/([Li_2O]+[Ta_2O_5])$ in a range of 0.482 to 0.505.

In another aspect of the present invention, the molar fraction of $[Li_2O]/([Li_2O]+[Nb_2O_5])$ of lithium niobate lies in a range of 0.490 to 0.505 or the molar fraction of $[Li_2O]/([Li_2O]+[Ta_2O_5])$ of lithium tantalate lies in a range of 0.490 to 0.505.

In another aspect of the present invention, said rare earth element is Tb, and is doped by an amount ranging from 10 weight ppm to 1000 weight ppm.

In a further aspect of the present invention, said photo-refractive material simultaneously includes Fe or Mn in addition to Tb.

In a still further aspect of the present invention, said photo-refractive material includes Fe or Mn by an amount ranging from 1 weight ppm to 500 weight ppm.

Also, the present invention provides a hologram recording method for directing interferable signal light and reference light into a hologram recording medium to record an information signal carried by the signal light, said hologram recording medium being sensitive to a first light at a first wavelength in an ultraviolet or short-wavelength visible light band to develop light induced absorption, said method comprising the steps of:

irradiating said hologram recording medium with said first light; and irradiating said hologram recording medium with signal light and reference light at a second wavelength longer than said first wavelength after said first light is irradiated.

DETAILED DESCRIPTION OF THE PREFERRED EMBODIMENTS

An embodiment of the present invention will hereinafter be described with reference to the accompanying drawings.

Figure 2:
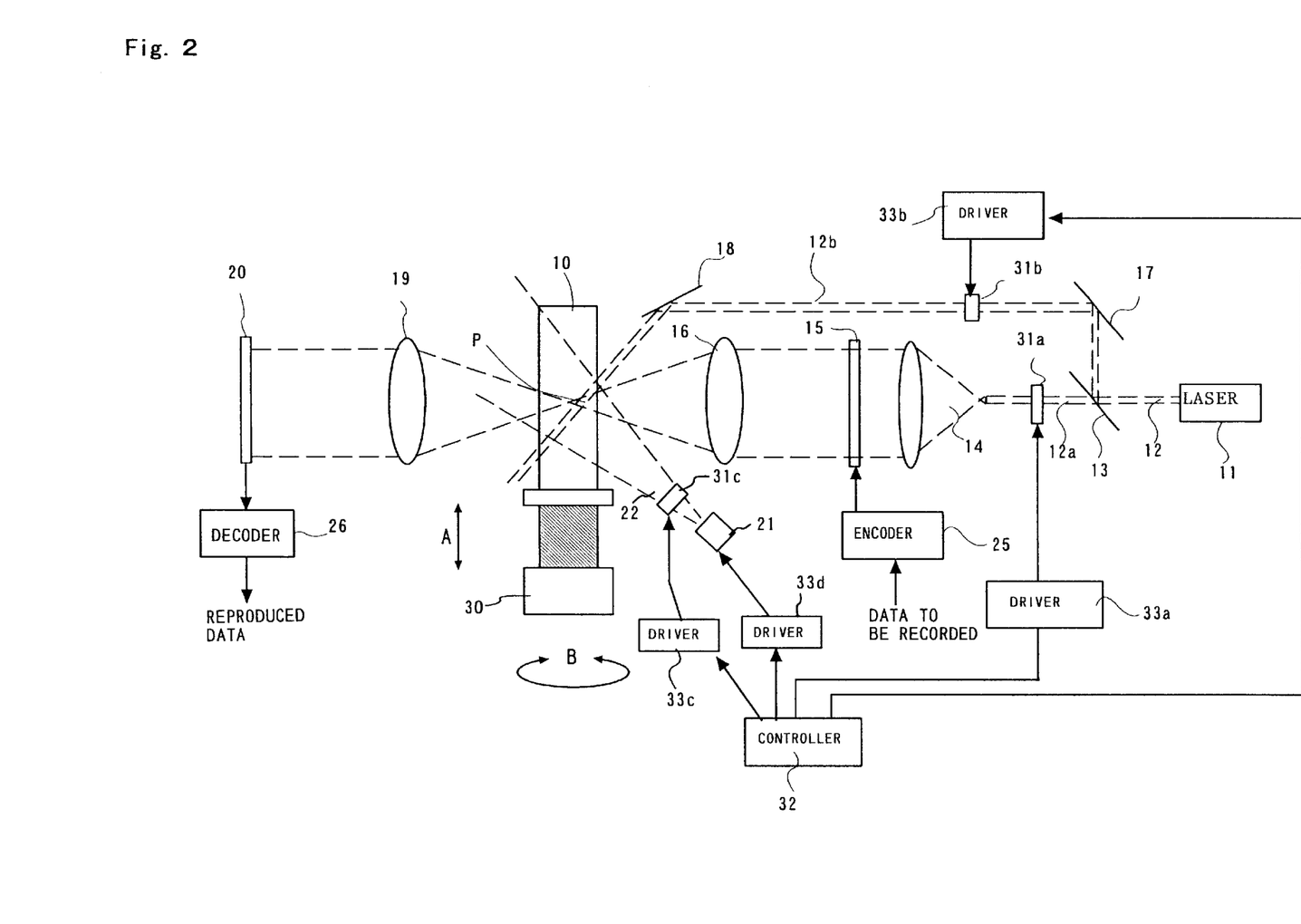
FIG. 2 is a block diagram illustrating a hologram recording/reproducing apparatus according to the present invention.

As illustrated in FIG. 2, a hologram recording apparatus according to the embodiment comprises a recording medium 10 which is formed of a photo-refractive crystal as a hologram recording medium that is sensitive to a first light at a first wavelength, i.e., in an ultraviolet ray band or in a short-wavelength visible light band to develop light induced absorption. This photo-refractive crystal may be lithium niobate ($LiNbO_3$) single crystal which is doped with a rare earth element such as Tb, and has a molar fraction of

[Li$_2$O]/([Li$_2$O]+[Nb$_2$O$_5$]) in a range of 0.482 to 0.505 preferably from 0.490 to 0.505 or from 0.495 to 0.500, or lithium tantalate (LiTaO$_3$) single crystal which is doped with a rare earth element such as Tb, and has a molar fraction of [Li$_2$O]/([Li$_2$O]+[Ta$_2$O$_5$]) in a range of 0.482 to 0.505 preferably from 0.490 to 0.505 or from 0.495 to 0.500. Preferably, the amount of added Tb is in a range of 10 weight ppm to 1000 weight ppm. Also, this photo-refractive material may be simultaneously doped with Fe or Mn in addition to Tb, and the amount of such an additional dopant is preferably in a range of 1 weight ppm to 500 weight ppm.

The general configuration of the apparatus according to the embodiment is based on a conventional hologram recording apparatus using signal light and reference light of a wavelength of, i.e., 532 nm, and additionally comprises an ultraviolet ray irradiation unit for irradiating ultraviolet rays or visible light in a short-wavelength range. The ultraviolet ray pre-irradiation unit may be incorporated in a body as illustrated in FIG. 2 such that a single light source irradiates ultraviolet rays through a light shutter or the like to the crystal. Alternatively, an ultraviolet light source may be provided as a unit separated from the hologram recording apparatus.

A hologram recording method employed in the embodiment includes an ultraviolet irradiating process, i.e., a so-called pre-irradiation which corresponds to an initialization process for a recording medium 10 which is performed before the recording medium 10 is irradiated with signal light and reference light.

Therefore, once the recording medium 10 is initialized, i.e., irradiated with ultraviolet rays for a predetermined time in the pre-irradiation, the recording/reproduction follows a procedure conforming to the conventional hologram recording/reproducing apparatus. The present invention reduces the reproduction deterioration in the multiplex recordings. Therefore, the invention provides a relaxed design for a scheduling of a recording time in the multiplex recordings, unlike the conventional recording scheme.

As illustrated in FIG. 2, a pre-irradiation light source 21 is an ultraviolet ray laser source generating a light beam at a first wavelength in an ultraviolet ray band or a short-wavelength visible light band, for example, at 313 nm. The light source 21 has a sufficient power to develop light induced absorption, i.e., coloring of the recording medium 10 by its irradiating light. A pre-light beam 22 emitted from the pre-irradiation light source 21 is irradiated through a shutter 31c and a mirror 23 to the entire recording medium 10 or at least a hologram recording portion. The shutter 31c is provided for opening and closing the optical path of the pre-irradiation light 22. The shutter 31c is driven to open and close through a driver 33c in response to a signal sent by a controller 32. The pre-irradiation light source 21 may be a light source capable of converge the light beam onto a position P within the entire recording medium 10 while decreasing the diameter of its light spot.

A light source 11 for emitting light at a second wavelength (532 nm) longer than the first wavelength of 313 nm is a YAG laser with a SHG (Secondary Harmonic Generation) device. A laser light beam 12 emitted from the laser light source 11 is split into signal light 12a and reference light 12b by a beam splitter 13. The signal light 12a and the reference light 12b trace different optical paths and irradiated to the same position P in the recording medium 10.

On the optical path of the signal light 12a, the shutter 31a, a beam expander 14, an LCD 15, and a 4-f based Fourier transform lens 16 are disposed in this order. The shutter 31a is provided for opening and closing the optical path of the signal light 12a. The shutter 31a is driven to open and close by the driver 33a in response to a signal set by the controller 33. The beam expander 14 expands the beam diameter of the signal light 12a after passing through the shutter 31a, and irradiates the LCD 15 with the signal light 12a as a collimated light beam. The LCD 15 functioning as a spatial light modulator receives from an encoder 25 electrical data of unit page sequence corresponding to a two-dimensional plane page to display a light/dark dot matrix signal. The signal light 12a is optically modulated as it passes through the LCD 15, and includes the data as dot matrix components. The signal light 12a further passes through the 4-f based Fourier transform lens 16 which Fourier transforms the dot matrix components, and is converged to focus slightly before (near the laser light source 11) or slight after the position P in the recording medium 10.

The reference light 12b split from the signal light 12a by the beam splitter 13 is transmitted to the position P in the recording medium 10 by mirrors 17 and 18. A shutter 31b is disposed between the mirrors 17 and 18 so that the optical path of the reference light 12b can be opened and closed. The shutter 31b is driven to open and close by a driver 33b in response to a signal sent from the controller 32.

Further, an inverse Fourier transform lens 19 and a CCD 20 functioning as a photo-receiver are disposed on the opposite side of the recording medium 10 to that on which the light from the laser light source 11 is incident, centered at the axis of rotation of the cylindrical recording medium 10. The CCD 20 is provided with an analyzer for decoding a dotted matrix signal of light and dark. The inverse Fourier transform lens 19 is disposed at a position such that the signal light 12a, which focuses near the position P within the recording medium 10, crosses over and reaches the inverse Fourier lens 19, can be delivered to the CCD 20 as a collimated light beam. The CCD 20 is connected to a decoder 26. It should be noted that a tag corresponding to the type of a particular photo-refractive crystal may be previously attached to the recording medium 10, such that the tag is automatically read by a suitable sensor as the recording medium 10 is mounted on a movable stage 30 to allow the controller 32 to control vertical movements and rotation of the recording medium 10.

With the apparatus configured as described above, a light interference pattern is formed by the reference light and the signal light in a region within the recording medium 10, and information is recorded therein as a change in refractive index.

For reproducing information, on the other hand, the shutter 31a blocks the signal light 12a to irradiate the recording medium 10 only with the reference light 12b. The light diffracted from the recording medium 10, which reproduces the recorded Fourier-transformed signal pattern, appears on the opposite side of the recording medium 10 to that irradiated with the reference light 12b. This Fourier-transformed signal pattern light is transmitted to an inverse Fourier lens 19 to inverse Fourier transform the Fourier-transformed light pattern to produce a dot pattern signal. The dot pattern signal is received by the CCD 20, functioning as a photo-receiver, which again converts the dot pattern signal to an electrical digital data signal which is then sent to a decoder for reproducing the original data.

The present invention is characterized by the employment of a recording material exhibiting the light induced absorption (photochromism). LiNbO$_3$ (or LiTaO$_3$) single crystals doped with a rare earth element such as Tb (terbium) or the like and having a stoichiometric composition exhibit very large light induced absorption when it is irradiated with ultraviolet rays at a wavelength near 313 nm. This is because carriers are excited from the light absorption center (donor level) near the valence band and trapped at the trap center (intermediate level). The depth of the intermediate level is calculated to be approximately 1.9 eV below the lower end of the valence band. The trapped carriers have reversibility so that they can be again excited by light at a wavelength shorter than 650 nm to return to the original donor level. Taking advantage of this property, laser light at a wavelength of approximately 532 nm may be used to record a hologram on a recording medium which has been irradiated with ultraviolet rays at a wavelength near 313 nm for coloring and filled with carriers at the intermediate level.

As the recording material is irradiated with a spatial light/dark pattern corresponding to interference fringes formed by reference light and signal light at a wavelength of 532 nm, the carriers at the intermediate level are excited in an irradiated portion of the recording material. The excited carriers are trapped again at a level near the valence band in a dark region, and finally, a spatial density distribution of the carriers is formed in correspondence to the interference fringes to produce a spatial electric field. In this way, an interference fringe pattern (hologram) is completely recorded within the crystals having a photorefractive effect as variations in refractive index.

The present invention differs largely from the prior art in the following characteristics:

(1) the recording medium is implemented by stoichiometric composition lithium niobate or stoichiometric composition lithium tantalate previously colored by ultraviolet rays (ultraviolet light) irradiated thereto; and (2) once recording is completed, the recorded data is not destroyed even if they are read with writing light (for example, at 532 nm).

With these characteristics, the hologram recording material and the recording scheme according to the present invention, when utilized, enables hologram recording without destructive reading even in a single color scheme.

(Embodiment)

Using a single crystal pulling equipment of a continuous source feeding type based on the double crucible method, a plurality of single crystals with the stoichiometric composition ratio (Tb-doped SLN) were grown which had an excellent optical homogeneous property. The Tb-doped single crystals with a molar fraction of $[Li_2O]/([Ta_2O_5]+[Li_2O])$ ranging from 0.482 to 0.505 were grown from a melted solution acquired by doping 100 weight ppm of Tb in the composition of a melted solution $[Li_2O]/([Ta_2O_5]+[Li_2O])$ ranging from 0.56 to 0.60.

Figure 3:
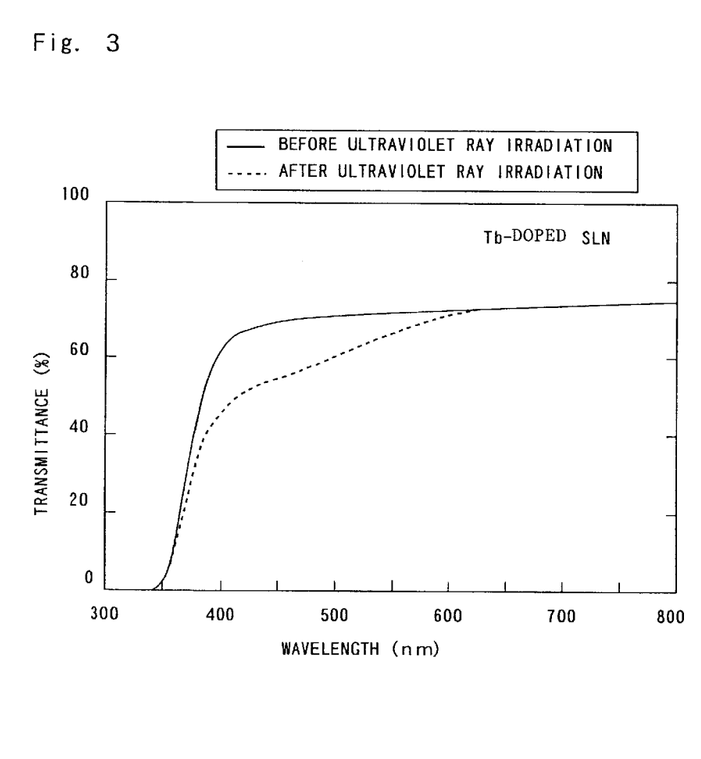
FIG. 3 is a graph showing variations in transmittance a hologram recording medium relative to irradiated wavelengths before and after pre-irradiation of ultraviolet rays on the medium in a hologram recording apparatus of an embodiment according to the present invention.

When the respective as-grown crystals were irradiated with light of a wavelength of 313 nm and measured in the light absorption spectrum, such single crystals with a molar fraction of $[Li_2O]/([Ta_2O_5]+[Li_2O])$ ranging from 0.482 to 0.505 showed photochromism. Particularly the resultant as-grown crystals with a molar fraction of $[Li_2O]/([Ta_2O_5]+[Li_2O])$ ranging from 0.490 to 0.505 or from 0.495 to 0.500 showed significant photochromism, as apparent from FIG. 3, changing from the absorption coefficient characteristic (solid line) before the light irradiation to the characteristic (dotted line) after the light irradiation. The trap center (intermediate level) was calculated to be approximately 1.9 eV below the valence band.

Figure 4:
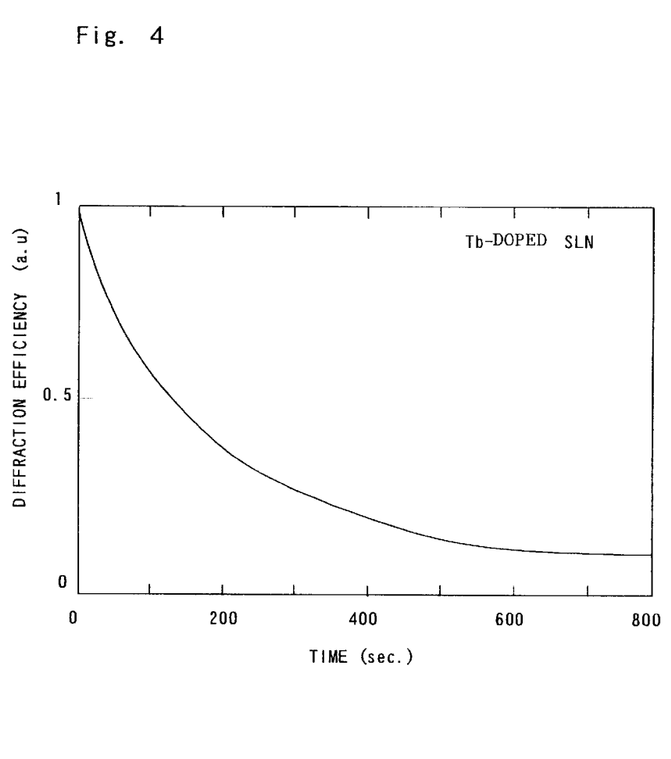
FIG. 4 is a graph illustrating a relationship between a diffraction efficiency and elapse of time after pre-irradiation of ultraviolet rays on the medium in a hologram recording apparatus of an embodiment according to the present invention.

The colored Tb-doped SLN crystal colored by irradiation with ultraviolet rays at a wavelength near 313 nm was irradiated with a laser at 532 nm to write a hologram thereinto. When measured in diffraction efficiency of the hologram, a high diffraction efficiency was obtained as shown in FIG. 4. This graph shows a change of elapsing diffraction efficiency of the colored crystal in case that reproduction is conducted while shielding one of used light beams after writing the hologram. The diffraction efficiency was normalized on the basis of a level immediately after recording. Experiences were conducted while the amount of added Tb was varied. The doped single crystals with such Tb-additives by an amount ranging from 10 weight ppm to 1000 weight ppm exhibited favorable results. It was observed that, when the crystal was read with a laser light beam having the same wavelength as writing light beam, diffraction efficiency decreased once and then became constant at the time of decreased, and after that, the hologram was not erased over a long time period.

Figure 5:
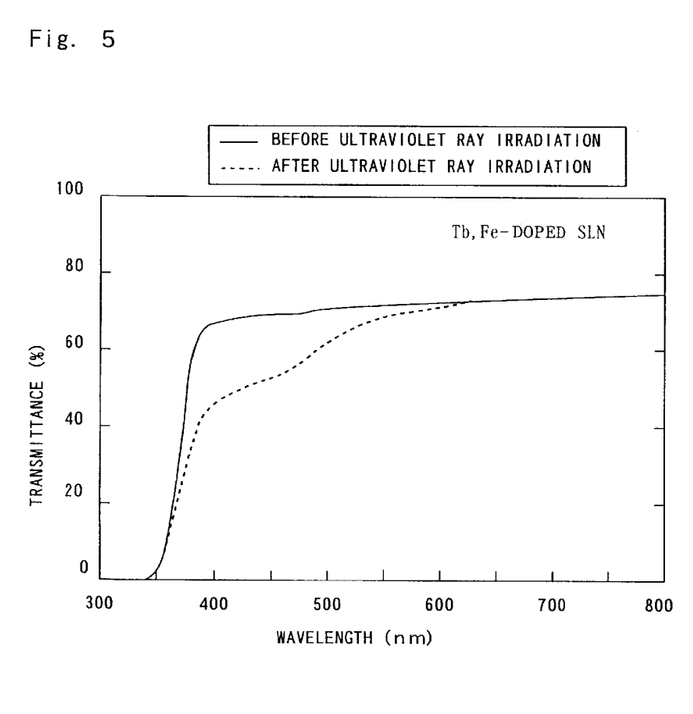
FIG. 5 is a graph showing variations in transmittance a hologram recording medium relative to irradiated wavelengths before and after pre-irradiation of ultraviolet rays on the medium in a hologram recording apparatus of another embodiment according to the present invention.
Figure 6:
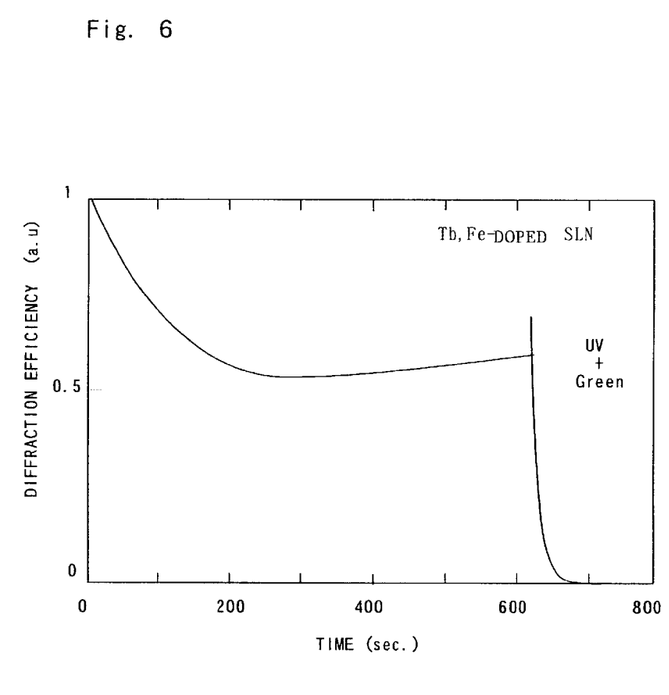
FIG. 6 is a graph illustrating a relationship between an induced absorption coefficient and elapse of time after pre-irradiation of ultraviolet rays on the medium in a hologram recording apparatus of another embodiment according to the present invention.

Further, the same investigation was made to stoichiometric composition single crystals doped simultaneously with Fe by 100 weight ppm, in addition to Tb by 200 weight ppm (Fe, Tb-doped SLN), with a molar fraction ranging from 0.495 to 0.50. The transmittance and diffraction efficiency were measured in each of the crystals. As shown in FIG. 5, the single crystal exhibited more significant photochromism. Also, in this case, the diffraction efficiency was increased as shown in FIG. 6, and the reading indistructivity was improved. With the latter case, similar effects were produced when Mn was doped in place of Fe, and particularly, single crystals doped with such additives by an amount ranging from one weight ppm to 500 weight ppm exhibited favorable results.

Figure 7:
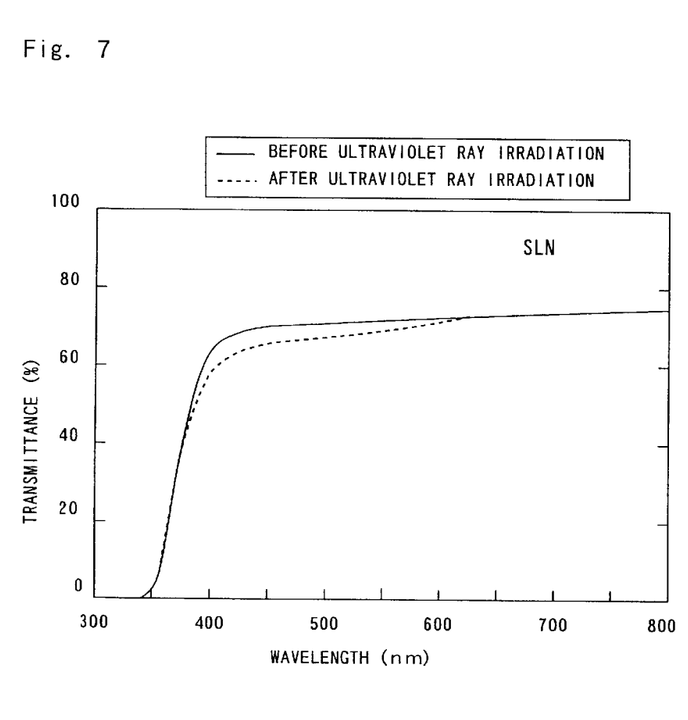
FIG. 7 is a graph showing variations of transmittance in a hologram recording medium relative to irradiated wavelengths before and after pre-irradiation of ultraviolet rays on the medium in a comparative hologram recording apparatus.
Figure 8:
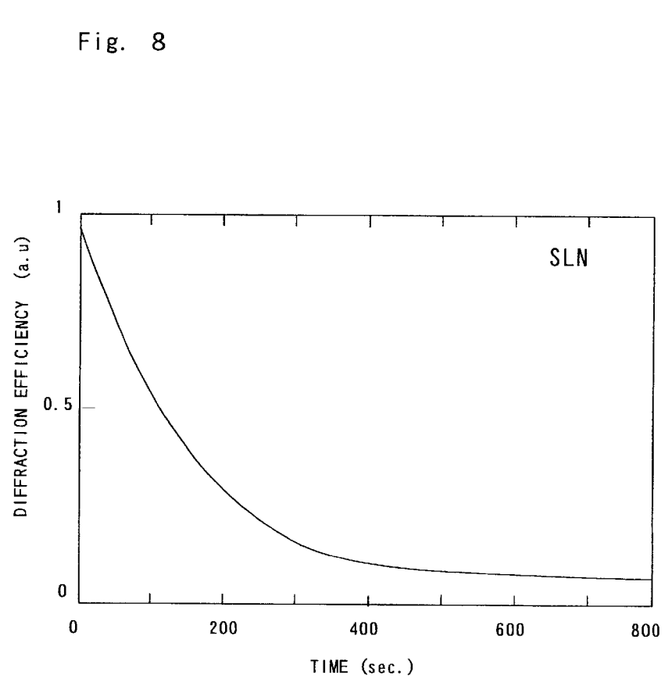
FIG. 8 is a graph illustrating a relationship between an induced absorption coefficient and elapse of time after pre-irradiation of ultraviolet rays on the medium in the comparative hologram recording apparatus.

As a comparative example, FIGS. 7 and 8 show data on the transmittance and diffraction efficiency obtained from an experiment in which a stoichiometric composition non-doped $LiNbO_3$ single crystal (SLN) was used. In comparison of the results in FIGS. 5 and 6 with those in FIGS. 7 and 8, it can be seen that an occurrence of photochromism in the comparative is less than that of the present invention.

Whereas an experiment as another embodiment was conducted using an Y-plate with a 3 mm thickness made of Fe, Tb-doped SLN. The crystal Y-plate was irradiated and colored with light at wavelength of approximately 313 nm. A hologram was written by means of irradiating two laser beams intersected to each other at an angle of 52° within the colored crystal plate. The two laser beams having the same intensity were generated by bisecting a light beam with a laser at 532 nm wavelength. The reproduction was performed from the formed hologram using an extraordinary light. The intensity of diffracted light generated from the formed hologram was measured while shielding one of used light beams in which the light intensity was kept constant. As a result, it was revealed that the diffraction effect is dependent on the recording light intensity from the present embodiment, unlike the conventional hologram. In addition, more the indistructivity of data was improved more the reproduction power was set to be lower than that of the recording power.

In addition to the embodiments of Tb-doped lithium niobate ($LiNbO_3$) as the foregoing description, single crystals of Tb-doped lithium tantalate ($LiTaO_3$) showed similar effects to the Tb-doped lithium niobate. It is also preferable that the single crystal of lithium tantalate ($LiTaO_3$) should have the molar fraction of $[Li_2O]/([Li_2O]+[Ta_2O_5])$ that lies in a range of 0.482 to 0.505 preferably 0.490 to 0.505 or 0.495 to 0.500.

According to the invention, the recording medium is colored by previous irradiation with light at a comparably short wavelength to make a recorded crystal filled with carriers at an intermediate level, and then the hologram is recorded using a light beam with a wavelength longer than the short wavelength. Therefore distinct interference patterns of light and dark including information signals are recorded clearly with in the medium.

What is claimed is:

1. A hologram recording apparatus for recording an information signal carried by a signal light, comprising:

a hologram recording medium exhibiting photochromism with sensitivity to a first light of a first wavelength in an ultraviolet or short-wavelength visible light band to develop light induced absorption;

means for irradiating said hologram recording medium with said first light; and means for irradiating said hologram recording medium with the signal light and a reference light of a second wavelength longer than said first wavelength after said first light has irradiated said hologram recording medium.

2. A hologram recording apparatus according to claim 1, wherein said hologram recording medium comprises a photo-refractive material selected from a group consisting of a lithium niobate ($LiNbO_3$) single crystal which includes a rare earth element, and has a molar fraction of $[Li_2O]/([Li_2O]+[Nb_2O_5])$ in a range of 0.482 to 0.505, or a lithium tantalate ($LiTaO_3$) single crystal which includes a rare earth element, and has a molar fraction of $[Li_2O]/([Li_2O]+[Ta_2O_5])$ in a range of 0.482 to 0.505.

3. A hologram recording apparatus according to claim 2, wherein the molar fraction of $[Li_2O]/([Li_2O]+[Nb_2O_5])$ of lithium niobate lies in a range of 0.490 to 0.505 or the molar fraction of $[Li_2O]/([Li_2O]+[Ta_2O_5])$ of lithium tantalate lies in a range of 0.490 to 0.505.

4. A hologram recording apparatus according to claim 2, wherein said rare earth element is Tb, and is doped by an amount ranging from 10 weight ppm to 1000 weight ppm.

5. A hologram recording apparatus according to claim 4, wherein said photo-refractive material simultaneously includes Fe or Mn in addition to Tb.

6. A hologram recording apparatus according to claim 5, wherein said photo-refractive material includes Fe or Mn by an amount ranging from 1 weight ppm to 500 weight ppm.

7. A hologram recording method for recording an information signal carried by a signal light, comprising the steps of:

providing a hologram recording medium exhibiting photochromism with sensitivity to a first light of a first wavelength in an ultraviolet or short-wavelength visible light band to develop light induced absorption;

irradiating said hologram recording medium with said first light; and irradiating said hologram recording medium with the signal light and a reference light of a second wavelength longer than said first wavelength after said first light has irradiated said hologram recording medium.

* * * * *

UNITED STATES PATENT AND TRADEMARK OFFICE
CERTIFICATE OF CORRECTION

PATENT NO. : 6,535,472 B1
DATED : March 18, 2003
INVENTOR(S) : Myeongkyu Lee et al.

It is certified that error appears in the above-identified patent and that said Letters Patent is hereby corrected as shown below:

<u>Title page,</u>
After "*Primary Examiner*-Nabil Hindi", insert the following:
-- [74] *Attorney, Agent, or Firm*-Finnegan, Henderson, Farabow, Garrett & Dunner, L.L.P. --.

Signed and Sealed this

Twenty-seventh Day of January, 2004

JON W. DUDAS
*Acting Director of the United States Patent and Trademark Office*